US009824130B1

(12) United States Patent
Korshunov et al.

(10) Patent No.: US 9,824,130 B1
(45) Date of Patent: Nov. 21, 2017

(54) OPTIMIZING SYNCHRONIZATION OF ENTERPRISE CONTENT MANAGEMENT SYSTEMS

(71) Applicant: Open Text Corporation

(72) Inventors: Dmitry Y. Korshunov, Pleasanton, CA (US); Dmitry Volchegursky, Pleasanton, CA (US); Shu-Shang Sam Wei, Danville, CA (US); Linda J. Wong, Dublin, CA (US); Dmitry Limonov, Dublin, CA (US); Boris Shpilyuck, Dublin, CA (US)

(73) Assignee: Open Text Corporation, Waterloo (CA)

( * ) Notice: Subject to any disclaimer, the term of this patent is extended or adjusted under 35 U.S.C. 154(b) by 657 days.

(21) Appl. No.: 14/106,506

(22) Filed: Dec. 13, 2013

(51) Int. Cl.
*G06F 17/30* (2006.01)

(52) U.S. Cl.
CPC .............................. *G06F 17/30575* (2013.01)

(58) Field of Classification Search
CPC .......... G06F 17/30607; G06F 17/3089; G06F 17/3048; G06F 17/30589; G06F 17/3028; G06F 17/30041; G06F 17/30053; G06F 17/30174; G06F 17/301949
USPC .................................................. 707/610, 637
See application file for complete search history.

(56) References Cited

U.S. PATENT DOCUMENTS 5,193,186 A * 3/1993 Tamaki ...................... G06F 9/52
713/502
5,887,143 A * 3/1999 Saito ......................... G06F 8/458
709/200
2002/0049764 A1* 4/2002 Boothby ............ G06F 17/30067
2003/0093431 A1* 5/2003 Cooke ................ G06F 17/30578
2003/0233370 A1* 12/2003 Barabas ............. G06F 17/30348
2005/0147130 A1* 7/2005 Hurwitz ............ G06F 17/30578
370/503
2007/0271309 A1* 11/2007 Witriol ................. H04L 67/1095
2008/0010563 A1* 1/2008 Nishimura ............ G06F 9/4812
714/55
2008/0294769 A1* 11/2008 Doi ........................ G06F 9/4843
709/224
2009/0225763 A1* 9/2009 Forsberg ............. H04L 12/5695
370/401

(Continued)

*Primary Examiner* — James Trujillo
*Assistant Examiner* — Fariborz Khoshnoodi
(74) *Attorney, Agent, or Firm* — Sprinkle IP Law Group

(57) ABSTRACT

Optimizing synchronization of enterprise content management systems is described. A system identifies multiple synchronization intervals corresponding to multiple synchronization tasks. The system estimates multiple execution times corresponding to the multiple synchronization tasks. The system calculates multiple remaining times corresponding to the multiple synchronization tasks, wherein the multiple remaining times are based on the multiple synchronization intervals corresponding to the multiple synchronization tasks minus the multiple execution times corresponding to the multiple synchronization tasks. The system orders the multiple synchronization tasks for execution based on corresponding multiple remaining times, from a lowest remaining time to a highest remaining time. The system executes a set of the multiple synchronization tasks based on a corresponding set of the multiple remaining times, wherein at least one of the corresponding set of the multiple remaining times equals the lowest remaining time.

20 Claims, 6 Drawing Sheets

(56) References Cited

U.S. PATENT DOCUMENTS

| | | | |
|---|---|---|---|
| 2012/0254881 A1* | 10/2012 | Hamamoto | G06F 9/4887 718/102 |
| 2012/0264371 A1* | 10/2012 | Kim | H04W 56/0015 455/13.2 |
| 2012/0331474 A1* | 12/2012 | Suzuki | G06F 9/4887 718/103 |
| 2013/0173918 A1* | 7/2013 | Saraswat | H04L 63/08 713/167 |

* cited by examiner

400

| Synchronization Tasks 404 | Shared Folder 406 | Synchronization Intervals 408 | Estimated Execution Times 410 | Remaining Times 412 |
|---|---|---|---|---|
| Design.doc | FolderC2 | 600 | 60 | 0 |
| InstallationGuide.pdf | FolderC2 | 600 | 60 | 0 |
| AdminGuide.pdf | FolderC1 | 600 | 5 | 0 |
| PresentationA.ppt | FolderB2 | 300 | 60 | 0 |
| SpecificationC.doc | FolderA1 | 60 | 5 | 0 |
| PresentationB.ppt | FolderB | 300 | 60 | 10 |
| SpecificationB.doc | FolderA | 60 | 50 | 10 |
| Requirements.xls | FolderC | 600 | 45 | 45 |
| Risks.xls | FolderC | 600 | 30 | 60 |
| Notes.doc | FolderC | 600 | 25 | 65 |
| PresentationC.ppt | FolderB | 300 | 5 | 65 |
| PresentationD.ppt | FolderB | 300 | 5 | 65 |

402

| Synchronization Tasks | Shared Folder | Synchronization Intervals | Estimated Execution Times | Remaining Times |
|---|---|---|---|---|
| SpecificationA.doc | FolderA | 60 | 70 | -10 |

| Synchronization Tasks | Shared Folder | Synchronization Intervals | Estimated Execution Times | Remaining Times |
|---|---|---|---|---|
| SpecificationC.doc | FolderA1 | 60 | 5 | 0 |
| AdminGuide.pdf | FolderC1 | 600 | 5 | 0 |
| SpecificationA.doc | FolderA | 60 | 70 | -10 |
| PresentationA.ppt | FolderB2 | 300 | 60 | 0 |
| Design.doc | FolderC2 | 600 | 60 | 0 |
| InstallationGuide.pdf | FolderC2 | 600 | 60 | 0 |

| Synchronization Tasks | Shared Folder | Synchronization Intervals | Estimated Execution Times | Remaining Times |
|---|---|---|---|---|
| SpecificationA.doc | FolderA | 60 | 70 | -10 |
| SpecificationC.doc | FolderA1 | 60 | 5 | 0 |
| PresentationA.ppt | FolderB2 | 300 | 60 | 0 |
| Design.doc | FolderC2 | 600 | 60 | 0 |
| InstallationGuide.pdf | FolderC2 | 600 | 60 | 0 |
| AdminGuide.pdf | FolderC1 | 600 | 5 | 0 |

*FIG. 6*

OPTIMIZING SYNCHRONIZATION OF ENTERPRISE CONTENT MANAGEMENT SYSTEMS

BACKGROUND

An enterprise content management system provides online access to content stored using digital technology, information formerly available only on paper, microfilm, or microfiche. An enterprise content management system generates new metadata about content as the content is checked in and out. Information about how and when content is used can enable an enterprise content management system to generate new filtering, routing and search pathways, and retention-rule decisions. An enterprise content management system provides access to data about email and instant messaging, which may be used in business decisions. The audit trail generated by an enterprise content management system enhances document security, and provides metrics to help measure productivity and identify efficiency. An enterprise content management system provides integrated solutions for multiple departments and systems, as many documents may cross multiple departments and affect multiple processes. For example, imaging, document management, and workflow can be combined in a customer service department to enable customer service agents to better resolve customer inquiries. Likewise, an accounting department may access supplier invoices from an electronic resource management system, access purchase orders from an imaging system, and access contracts from a document management system as part of an approval workflow. Similarly, an organization may present information via the World Wide Web, which requires managing web content.

In enterprise content management systems, a repository synchronization process involves analysis of changes and propagation of those changes between enterprise content management system repositories. If a cloud-based system which provides services to synchronize enterprise content management system repositories does not satisfy service level agreements that require synchronization of each dataset within a configured time interval, or synchronization interval, the providers of the cloud-based system pays a penalty fee to users of the enterprise content management system.

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

FIG. 4 illustrates example ordered queues for optimizing synchronization of enterprise content management systems, under an embodiment;

FIG. 5 illustrates another example ordered queue for optimizing synchronization of enterprise content management systems, under an embodiment;

FIG. 6 illustrates yet another example ordered queue for optimizing synchronization of enterprise content management systems, under an embodiment.

DETAILED DESCRIPTION

Figure 1:
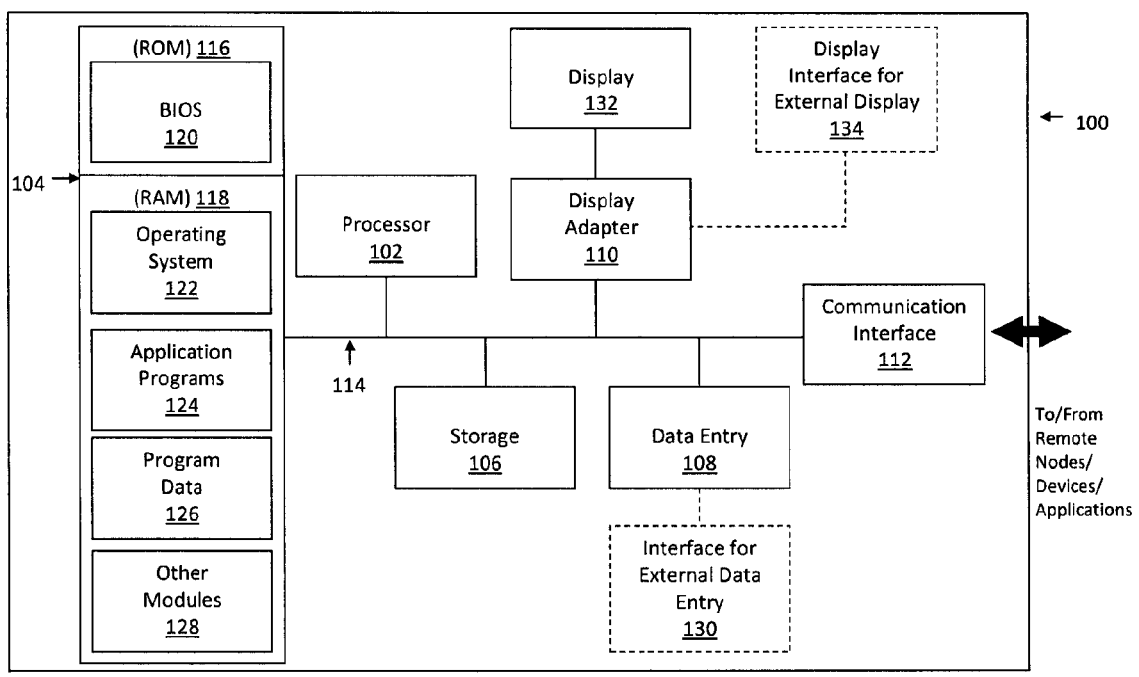
FIG. 1 is a block diagram illustrating an example hardware device in which the subject matter may be implemented.

The synchronization of each object modification may be executed as an individual synchronization task, such that changes which occur within a dataset or content folder may be executed as series of synchronization tasks. Each synchronization task may be executed independently, thereby, allowing parallelization of the synchronization workload. If a synchronization task has a relatively longer synchronization interval, the execution of the synchronization task may take relatively longer because the synchronization task has a significant amount of changes accumulated during the relatively longer synchronization interval. If the synchronization tasks that require longer execution times are frequently interrupted by many synchronization tasks that require shorter execution times, the longer executing synchronization tasks may not be able to complete execution until violating their service level agreements. However, if the longer execution synchronization tasks are given priority over the many shorter execution synchronization tasks, the longer execution synchronization tasks may consume the system resources for significant periods of time at the expense of the shorter execution synchronization tasks, such that many of the shorter execution synchronization tasks may not execute until violating their service level agreements.

Embodiments herein enable optimizing synchronization of enterprise content management systems. A system identifies multiple synchronization intervals corresponding to multiple synchronization tasks. For example, an optimizer tool identifies a first task with a 600 seconds synchronization interval, a second task with a 60 seconds synchronization interval, a third task with a 300 seconds synchronization interval, a fourth task with a 600 seconds synchronization interval, a fifth task with a 60 seconds synchronization interval, and a sixth task with a 300 seconds synchronization interval. The system estimates multiple execution times corresponding to the multiple synchronization tasks. For example, the optimizer tool estimates that the first task has a 60 seconds execution time, the second task has a 60 seconds execution time, the third task has a 60 seconds execution time, the fourth task has a 5 seconds execution time, the fifth task has a 5 seconds execution time, and the sixth task has a 5 seconds execution time. The system calculates multiple remaining times corresponding to the multiple synchronization tasks, wherein the multiple remaining times are based on the multiple synchronization intervals corresponding to the multiple synchronization tasks minus the multiple execution times corresponding to the multiple synchronization tasks. For example, the optimizer tool calculates that that the first task has a 540 seconds remaining time, the second task has a 0 seconds remaining time, the third task has a 240 seconds remaining time, the fourth task has a 595 seconds remaining time, the fifth task has a 45 seconds remaining time, and the sixth task has a 295 seconds remaining time. The system orders the multiple synchronization tasks for execution based on corresponding multiple remaining times, from a lowest remaining time to a highest remaining time. For example, the optimizer tool orders the tasks based on the second task with a 0 seconds remaining time, the fifth task with a 45 seconds remaining time, the third task with a 240 seconds remaining time, the sixth task with a 295 seconds remaining time, the first task with a 540 seconds remaining time, and the fourth task with a 595 seconds remaining time. The system executes a set of the multiple synchronization tasks based on a corresponding set of the multiple remaining times, wherein at least one of the corresponding set of the multiple remaining times equals the lowest remaining time. For example, the optimizer tool provides the second task and the fifth task for execution because the system has two synchronization agents available and the second task and the fifth task are the top two priority tasks in the order established by the optimizer tool, as the second task and the fifth task have the least remaining time of the six tasks.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAM-BUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the hardware device 100.

The hardware device 100 may operate in a networked environment using logical connections to one or more remote nodes (not shown) via communication interface 112. The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context. In an embodiment, the computer system 100 includes one or more methods for optimizing synchronization of enterprise content management systems.

Figure 2:
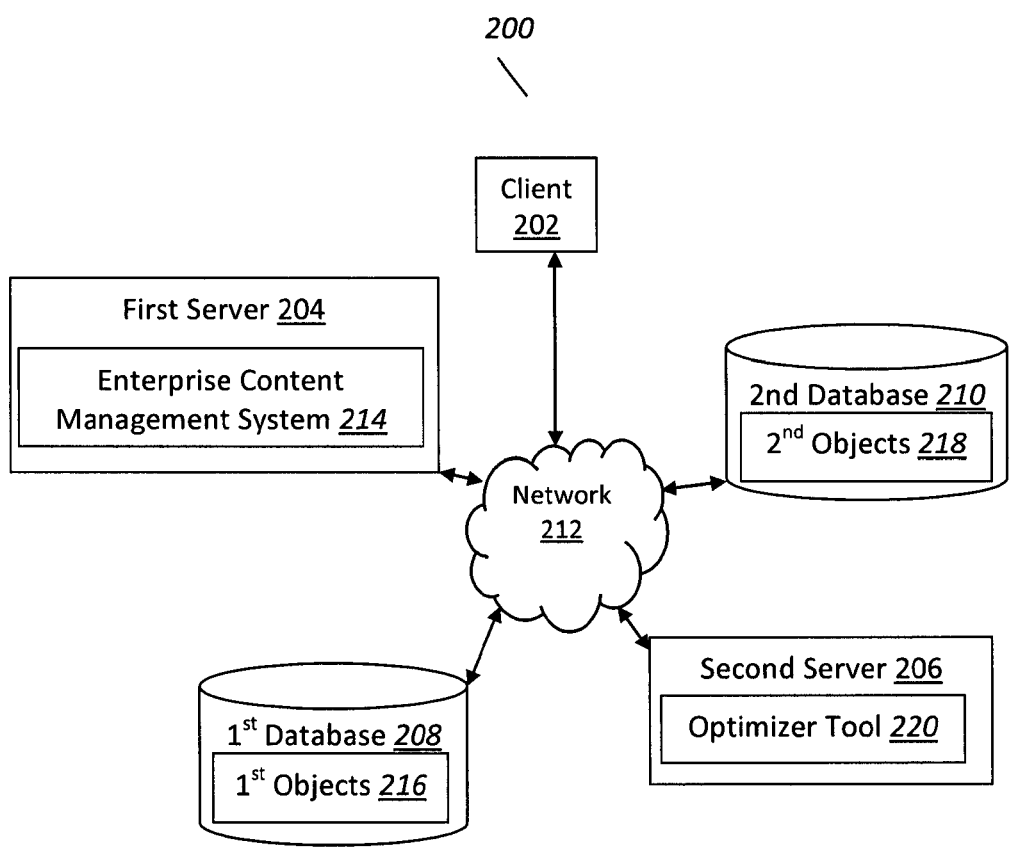
FIG. 2 illustrates a block diagram of an example system for optimizing synchronization of enterprise content management systems, under an embodiment.

FIG. 2 illustrates a block diagram of a system that implements optimizing synchronization of enterprise management systems, under an embodiment. As shown in FIG. 2, system 200 may illustrate a cloud computing environment in which data, applications, services, and other resources are stored and delivered through shared data-centers and appear as a single point of access for the users. The system 200 may also represent any other type of distributed computer network environment in which servers control the storage and distribution of resources and services for different client users.

In an embodiment, the system 200 represents a cloud computing system that includes a client 202, and a first server 204 and a second server 206 that are provided by a hosting company. The client 202, the servers 204-206, a first database 208, and a second database 210 communicate via a network 212. The first server 204 includes an enterprise content management system 214 associated with the first database 208, which includes first objects 216; and the second database 210, which includes second objects 218, while the second server 206 includes a optimizer tool 220, which optimizes synchronization between the first database 208 and the second database 210. The databases 208-210 may be referred to as Documentum® databases 208-210 provided by EMC® Corporation, Syncplicity databases 208-210 provided by provided by EMC® Corporation, or any combination of Documentum® databases and Syncplicity databases. Alternatively, the databases 208-210 may be some other database known in the art. The client 202 and the servers 204-206 may each be substantially similar to the system 100 depicted in FIG. 1. Although FIG. 2 depicts only one client 202, two servers 204-206, two databases 208-210, one network 212, and one of each of the system elements 214-220, the system 200 may include any number of clients 202, servers 204-206, databases 208-210, networks 212, and each of the system elements 214-220.

Instead of assigning execution priorities to synchronization tasks based on the synchronization intervals of the synchronization tasks, the system 200 assigns execution priorities to synchronization tasks based on how long each synchronization task can wait until its synchronization interval expires. The system 200 optimizes each synchronization task's consumption of system resources, thereby increasing the possibility that each synchronization tasks executes before its synchronization interval expires. The system 200 gathers statistics about the execution of all synchronization tasks, including how long execution of each synchronization task requires, to determine how long each synchronization task can wait until its synchronization interval expires.

The system 200 identifies multiple synchronization intervals corresponding to multiple synchronization tasks. For example, the optimizer tool 220 identifies a first dataset with a 600 seconds synchronization interval and a second dataset with a 60 seconds synchronization interval. The first dataset has a first task, the second dataset has a second task, the first dataset has a third task, the second dataset has a fourth task, the first data set has a fifth task, and the second dataset has a sixth task, Therefore, the optimizer tool 220 identifies the first task with a 600 seconds synchronization interval, the second task with a 60 seconds synchronization interval, the third task with a 300 seconds synchronization interval, the fourth task with a 600 seconds synchronization interval, the fifth task with a 60 seconds synchronization interval, and the sixth task with a 300 seconds synchronization interval, with each of the synchronization intervals based on corresponding service level agreements.

The system 200 estimates multiple execution times corresponding to the multiple synchronization tasks. For example, the optimizer tool 220 estimates that the first task has a 60 seconds execution time, the second task has a 60 seconds execution time, the third task has a 60 seconds execution time, the fourth task has a 5 seconds execution time, the fifth task has a 5 seconds execution time, and the sixth task has a 5 seconds execution time. The optimizer tool 220 may estimate the execution times based on the synchronization task types and/or a time of day. For example, if a synchronization task includes a disproportionately higher percentage of content transferring operations, such as the create changes and the update changes which are the most time-consuming operation, the optimizer tool 220 revises the initial estimate of the execution time, which may be based on the amount, or size, of the content changed. The optimizer tool 220 may estimate execution times for a synchronization task based on the most recent historical data, such as the 10 most recent values, within some predefined interval of time, such as the last hour. Initially, when historical data does not exist yet, the optimizer tool 220 may use some default values to estimate execution times.

The time required to execute each synchronization task may vary over the course of a day, such as more execution time may be required to transfer the amount of content during the hours when the peak system load occurs relative to non-peak hours. Therefore, execution time may be expressed as a function of the time of day, such as the amount of content to be transferred divided by the transfer rate at that time of day. References below to FIG. 3 describe estimates of execution times based on the time of the day.

The system 200 calculates multiple remaining times corresponding to the multiple synchronization tasks, wherein the multiple remaining times are based on the multiple synchronization intervals corresponding to the multiple synchronization tasks minus the multiple execution times corresponding to the multiple synchronization tasks. For example, the optimizer tool 220 calculates that that the first task has a 540 seconds remaining time, the second task has a 0 seconds remaining time, the third task has a 240 seconds remaining time, the fourth task has a 595 seconds remaining time, the fifth task has a 45 seconds remaining time, and the sixth task has a 295 seconds remaining time. References below to FIG. 4 describe a less simplified example of remaining times for tasks.

The system 200 orders the multiple synchronization tasks for execution based on a corresponding multiple remaining times, from a lowest remaining time to a highest remaining time. For example, the optimizer tool 220 orders the tasks based on the second task with a 0 seconds remaining time, the fifth task with a 45 seconds remaining time, the third task with a 240 seconds remaining time, the sixth task with a 295 seconds remaining time, the first task with a 540 seconds remaining time, and the fourth task with a 595 seconds remaining time. References below to FIG. 4 describe a less simplified example of ordering tasks based on remaining times.

The system 200 executes a set of the multiple synchronization tasks based on a corresponding set of the multiple remaining times, wherein at least one of the corresponding set of the multiple remaining times equals the lowest remaining time. For example, the optimizer tool 220 provides the second task and the fifth task for execution because the system 200 has two synchronization agents available and the second task and the fifth task are the top two priority tasks in the order established by the optimizer tool, as the second task and the fifth task have the least remaining time of the six tasks. After a synchronization task is executed, the optimizer tool 220 records information about the execution, which may be used to estimate subsequent execution times. References below to FIGS. 5 and 6 describe a less simplified example of executing tasks based on remaining times.

Figure 3:
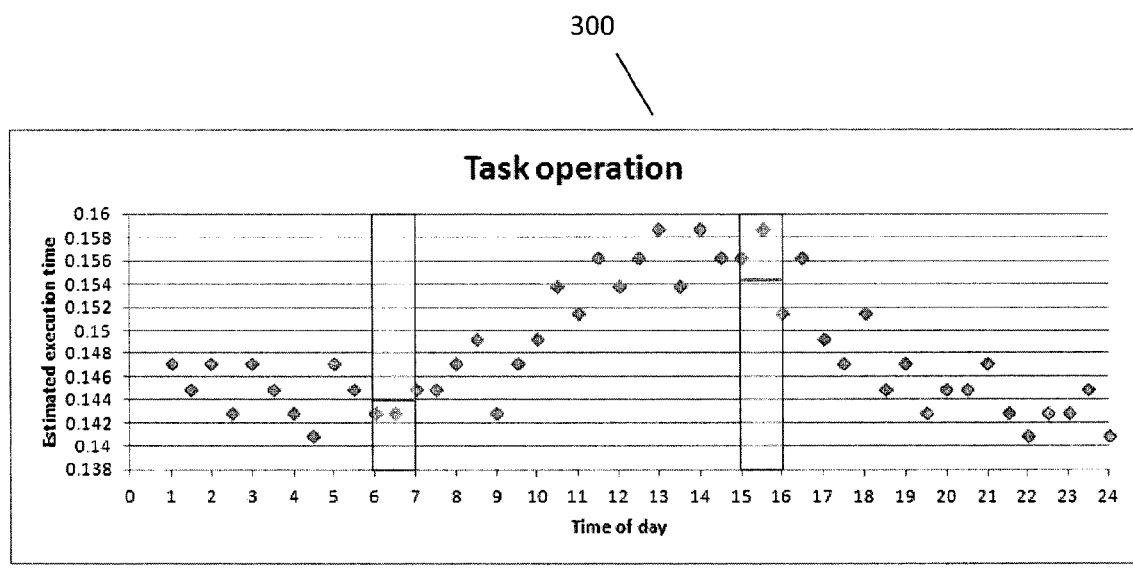
FIG. 3 illustrates an example execution time graph for optimizing synchronization of enterprise content management systems, under an embodiment.

FIG. 3 illustrates an example execution time graph for optimizing synchronization of enterprise content management systems, under an embodiment. An execution time graph 300 depicts 48 data points for execution times, ranging from 0.138 to 0.160, every half hour over a 24 hour period. The optimizer tool 220 may initially estimate the execution time for a task based on the amount, or size, of the content changed, and then revise the initial estimate based on the historical data that reflects the impact of the time of the day on execution time, which may be based on content transfer time.

FIG. 4 illustrates example ordered queues for optimizing synchronization of enterprise content management systems, under an embodiment. FIG. 4 includes a first ordered queue 400 and a second ordered queue 402. The first ordered queue 400 includes a synchronization tasks 404 column, a shared folder 406 column, a synchronization intervals 408 column, an estimated execution times column 410, and a remaining times column 412. The columns 404-412 include rows of data for a queue. The first ordered queue 400 includes rows for synchronization intervals, which are included in the synchronization intervals column 412, and estimated execution times, which are included in the estimated execution times column 410, that the optimizer tool 220 identified and estimated for multiple groups of tasks, which are included in the synchronization tasks column 412, over an extended period of time.

Some of these tasks are grouped together because they represent the synchronization of different objects which are stored in the same content folder. For example, the first data row of the first ordered queue 400 includes information for the synchronization task which is to synchronize the object "Design.Doc," which is stored in the folder C2, according to the shared folder column 412, and the second data row of the first ordered queue 400 includes information for the synchronization task which is to synchronize the object "InstallationGuide.pdf," which is also stored in the folder C2, according to the shared folder column 412. The first ordered queue 400 holds the tasks that can still wait until their corresponding synchronization intervals will expire, ordered by the remaining time left until their corresponding synchronization intervals will expire.

The optimizer tool 220 orders the 12 tasks in the first ordered queue 400 based on their corresponding remaining times, which are included in the remaining times column 412. Time passes as tasks await execution in the first ordered queue 400, and the optimizer tool 220 periodically decrementing each of the remaining times based on the passage of time. For example, the first data row in the first ordered queue 400 indicates that the synchronization task for the object "Design.doc" has a synchronization interval of 600 seconds and an estimated execution time of 60 seconds, which initially resulted in the optimizer tool 220 calculating a remaining time of 540 seconds for this task. A remaining time of 540 seconds may have initially resulted in the optimizer tool 220 ordering the "Design.doc" synchronization task towards the bottom of the first ordered queue 400. However, 540 seconds later the optimizer tool 220 has periodically decremented the 540 seconds of remaining time for the "Design.doc" synchronization task, perhaps every 5 seconds when the optimizer tool 220 adds more tasks to the first ordered queue 400 and reorders the tasks in the first ordered queue 400, until the "Design.doc" synchronization task has 0 remaining seconds, such that the optimizer tool 220 orders the "Design.doc" synchronization task towards the top of the first ordered queue 400.

Periodically, the optimizer tool 220 may designate synchronization tasks at the top of the first ordered queue 400 for execution. For example, the optimizer tool 220 designates the 5 tasks at the top of the first ordered queue 400 for execution because the remaining times for each of these 5 tasks is 0 seconds. Although this example describes the optimizer tool 220 designating tasks for execution when the tasks' remaining times equals zero, the remaining time threshold may equal a value other than zero, or the optimizer tool 220 may designate a number of tasks at the top of the first ordered queue 400 for execution regardless of their remaining times, such as designating the top 6 tasks for execution because 6 synchronization agents are available to execute 6 synchronization tasks. The optimizer tool 220 limits the number of tasks designated for execution to the number of synchronization agents available because the optimizer tool 220 may identify additional synchronization tasks with high execution priorities while the synchronization agents are synchronizing the synchronization tasks already designated for execution. When designating the tasks for execution, the optimizer tool 220 may move these tasks to a second queue, such as the second ordered queue 402, for further synchronization optimizing.

The second ordered queue 402 includes columns and rows that are substantially similar to the columns 404-412 and rows of the first ordered queue 400. The second ordered queue 402 holds tasks that need to be synchronized immediately, or close to immediately, but which need further prioritization. If the optimizer tool 220 initially calculates that the remaining time for a synchronization task is 0 seconds, or less than a remaining time threshold, the optimizer tool 220 may initially assign the synchronization task to the second ordered queue 402, instead of the first ordered queue 400. In this example, the second ordered queue 402 includes data rows for only one task, which has a remaining time of −10 seconds, which indicates that the task already failed to meet its synchronization interval by 10 seconds. Although the combination of variable system loads and limited system resources may result in some tasks failing to meet their synchronization intervals, the optimizer tool 220 can minimize how often such failures occur. If the optimizer tool 220 moves the 5 tasks at the top of the first ordered queue 402 to the second ordered queue 402 for further synchronization optimizing, the move may initially result in the group of tasks included in a third ordered queue 500 in FIG. 5.

FIG. 5 illustrates another example ordered queue for optimizing synchronization of enterprise content management systems, under an embodiment. The third ordered queue 500 includes columns and rows that are substantially similar to the columns 404-412 and rows of the first ordered queue 400. After the optimizer tool 220 moves the 5 tasks at the top of the first ordered queue 400 to the second ordered queue 402, the optimizer tool 220 further optimizes synchronization.

The optimizer tool 220 orders the tasks for execution by ordering tasks with the same remaining times based on the synchronization intervals for the tasks, with smaller synchronization intervals ordered before larger synchronization intervals. For example, the first ordered queue 400 orders the task for "Design.doc" before the task for "PresentationA.ppt," as both of these tasks are ordered based on their remaining times, which is 0 seconds for each task. In a contrasting example, the third ordered queue 500 orders the task for "PresentationA.ppt" before the task for "Design.doc" because both of these tasks have remaining times of 0 seconds and the task for "PresentationA.ppt" has a synchronization interval of 300 seconds while the task for "Design.doc"" has a synchronization interval of 600 seconds. However, the task for "SpecificationA.doc" is ordered before other tasks with lower synchronization intervals because the task for "SpecificationA.doc" has a remaining time of −10 seconds, which is less than the remaining time of 0 seconds for the other tasks with lower synchronization intervals. The optimizer tool 220 orders tasks with the same remaining time and the same synchronization interval based on their estimated execution times, in descending order. After ordering tasks with the same remaining times based on the synchronization intervals for the tasks, the optimizer tool 220 may further optimize synchronization, which may result in the group of tasks included in a fourth ordered queue 600 in FIG. 6.

FIG. 6 illustrates yet another example ordered queue for optimizing synchronization of enterprise content management systems, under an embodiment. The fourth ordered queue 600 includes columns and rows that are substantially similar to the columns 404-412 and rows of the first ordered queue 400. The optimizer tool 220 may further optimize synchronization by ordering a task before other tasks if the synchronization task has an estimated execution time that is less than an execution time threshold.

The optimizer tool 220 may prioritize a synchronization task with a specified short estimated execution time to execute before synchronization tasks with longer estimated execution times, which insures that the synchronization task with the specified short execution time executes before its synchronization interval expires, without significantly affecting the possibility for the synchronization tasks with the longer synchronization times to execute before their synchronization intervals expire. For example, two of the tasks in the third ordered queue 500 have estimated execution times of 5 seconds, whereas the rest of the tasks in the third ordered queue 500 have estimated execution times of 60 seconds or more. Therefore, the optimizer tool 220 moves these two tasks with estimated execution times of 5 seconds each to the top of the fourth ordered queue 600.

The optimizer tool 220 may limit the number of synchronization tasks with the shorter execution times that are prioritized over the synchronization tasks with the longer execution times to the number of available synchronization agents. The optimizer tool 220 may determine the estimated execution time threshold in any of a number of different ways. For example, the data in the third ordered queue 500 indicates that the maximum estimated execution time for these 6 tasks is 70 seconds, the minimum synchronization interval for these 6 tasks is 60 seconds, and the minimum estimated execution time for these 6 tasks is 5 seconds. The difference between the minimum and maximum estimated execution time should be at least 60 seconds divided by 5 seconds equals 12 times. Therefore, the estimated execution time of any task that can be ordered ahead of the other tasks should be no more than 70 seconds divided by 12 times equals 5.8 seconds. Two tasks with estimated execution times of 5 seconds each meet this estimated execution time threshold of 5.8 seconds. Consequently, the optimizer tool 220 moves these two tasks with estimated execution times of 5 seconds each to the top of the fourth ordered queue 600. After the optimizer tool 220 further optimizes synchronization by ordering tasks with estimated execution times that are less than an execution time threshold, the optimizer tool 220 may move the newly ordered tasks directly to an execution queue, which may be a first in, first out (FIFO) queue.

Figure 7:
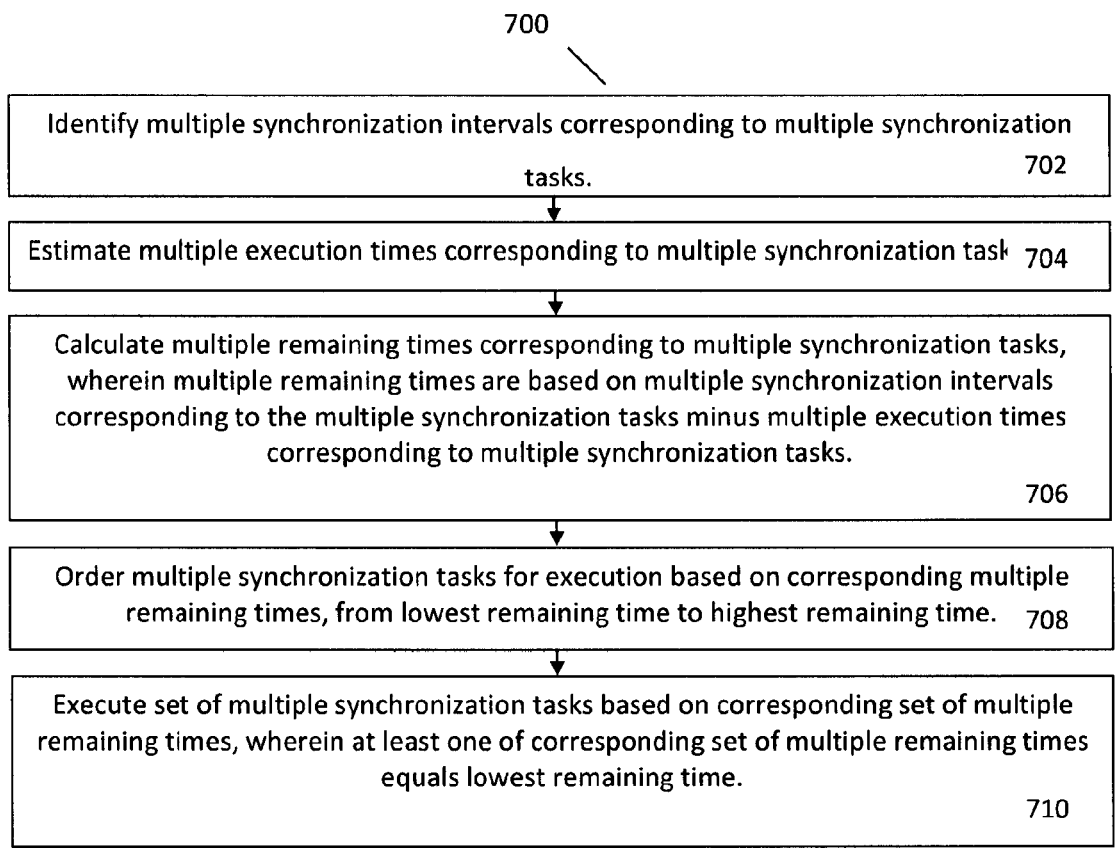
FIG. 7 is a flowchart that illustrates an example method for optimizing synchronization of enterprise content management systems, under an embodiment.

FIG. 7 is a flowchart that illustrates a method for optimizing synchronization of enterprise content management systems. Flowchart 700 illustrates method acts illustrated as flowchart blocks for certain steps involved in and/or between the client 202 and/or the servers 204-206 of FIG. 2. In some embodiments, the method illustrated by the flowchart 700 may be executed by a single server, such as server 204.

Multiple synchronization intervals are identified corresponding to multiple synchronization tasks, block 702. For example, the optimizer tool 220 identifies a first task with a 600 seconds synchronization interval, a second task with a 60 seconds synchronization interval, a third task with a 300 seconds synchronization interval, a fourth task with a 600 seconds synchronization interval, a fifth task with a 60 seconds synchronization interval, and a sixth task with a 300 seconds synchronization interval.

Multiple execution times are estimated corresponding to multiple synchronization tasks, block 704. For example, the optimizer tool 220 estimates that the first task has a 60 seconds execution time, the second task has a 60 seconds execution time, the third task has a 60 seconds execution time, the fourth task has a 5 seconds execution time, the fifth task has a 5 seconds execution time, and the sixth task has a 5 seconds execution time.

Multiple remaining times are calculated corresponding to multiple synchronization tasks, wherein the multiple remaining times are based on multiple synchronization intervals corresponding to the multiple synchronization tasks minus multiple execution times corresponding to the multiple synchronization tasks, block 706. For example, the optimizer tool 220 calculates that that the first task has a 540 seconds remaining time, the second task has a 0 seconds remaining time, the third task has a 240 seconds remaining time, the fourth task has a 595 seconds remaining time, the fifth task has a 45 seconds remaining time, and the sixth task has a 295 seconds remaining time.

Multiple synchronization tasks are ordered for execution based on a corresponding multiple remaining times, from a lowest remaining time to a highest remaining time, block 708. For example, the optimizer tool 220 orders the tasks based on the second task with a 0 seconds remaining time, the fifth task with a 45 seconds remaining time, the third task with a 240 seconds remaining time, the sixth task with a 295 seconds remaining time, the first task with a 540 seconds remaining time, and the fourth task with a 595 seconds remaining time.

A set of multiple synchronization tasks are executed based on a corresponding set of multiple remaining times, wherein at least one of the corresponding set of the multiple remaining times equals a lowest remaining time, block 710. For example, the optimizer tool 220 provides the second task and the fifth task for execution because the system 200 has two synchronization agents available and the second task and the fifth task are the top two priority tasks in the order established by the optimizer tool 220, as the second task and the fifth task have the least remaining time of the six tasks.

Although FIG. 4 depicts the blocks 702-710 occurring in a specific order, the blocks 702-710 may occur in another order. Embodiments herein enable optimizing synchronization of enterprise content management systems.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A system for optimizing synchronization of enterprise content management systems, the system comprising:
   a processor; and
   a processor-based application executed by the processor which cause the processor to:
   identify a plurality of synchronization intervals corresponding to a plurality of synchronization tasks for synchronizing content changes between a first database associated with a content management system and a second database;
   identify a plurality of estimated execution times corresponding to the plurality of synchronization tasks;
   calculate a plurality of remaining times corresponding to the plurality of synchronization tasks, wherein the plurality of remaining times is based on the plurality of synchronization intervals corresponding to the plurality of synchronization tasks minus the plurality of estimated execution times corresponding to the plurality of synchronization tasks;

order the plurality of synchronization tasks for execution based on the corresponding plurality of remaining times, from a lowest remaining time to a highest remaining time;

execute a set of the plurality of synchronization tasks based on a corresponding set of the plurality of remaining times to change one or more objects in the second database based on a change to one or more objects in the first database, wherein at least one of the corresponding set of the plurality of remaining times comprises the lowest remaining time.

2. The system of claim 1, wherein the plurality of synchronization intervals is based on a corresponding plurality of service level agreements.

3. The system of claim 1, wherein estimating the plurality of estimated execution times is based on at least one of a time of day and a plurality of synchronization task types.

4. The system of claim 1, wherein ordering the plurality of synchronization tasks for execution based on the corresponding plurality of remaining times further comprises ordering a first synchronization task corresponding to a first remaining time before a second synchronization task corresponding to a second remaining time that equals the first remaining time based on the first synchronization task corresponding to a first synchronization interval and the second synchronization task corresponding to a second synchronization interval, wherein the first synchronization interval is less than the second synchronization interval.

5. The system of claim 1, wherein executing the set of the plurality of synchronization tasks comprises:

decrementing each of the plurality of remaining times periodically based on a passage of time;

determining whether a synchronization task of the plurality of synchronization tasks corresponds to an execution time that is less than an execution time threshold;

ordering the synchronization task before other synchronization tasks of the plurality of synchronization tasks in response to a determination that the synchronization task corresponds to the execution time that is less than the execution time threshold; and executing the set of the plurality of synchronization tasks based on the corresponding set of the plurality of remaining times and the execution time that is less than the execution time threshold.

6. The system of claim 1, wherein the set of the plurality of synchronization tasks comprises a number of synchronization tasks that equals a number of available system synchronization agents.

7. The system of claim 1, wherein each of the corresponding set of the plurality of remaining times is less than a remaining time threshold.

8. A computer-implemented method for optimizing synchronization of enterprise content management systems, the method comprising:

identifying a plurality of synchronization intervals corresponding to a plurality of synchronization tasks for synchronizing content changes between a first database associated with a content management system and a second database;

estimating a plurality of execution times corresponding to the plurality of synchronization tasks;

calculating a plurality of remaining times corresponding to the plurality of synchronization tasks, wherein the plurality of remaining times is based on the plurality of synchronization intervals corresponding to the plurality of synchronization tasks minus the estimated plurality of execution times corresponding to the plurality of synchronization tasks;

ordering the plurality of synchronization tasks for execution based on the corresponding plurality of remaining times, from a lowest remaining time to a highest remaining time;

executing a set of the plurality of synchronization tasks to change one or more objects in the second database based on a change to one or more objects in the first database, said executing based on a corresponding set of the plurality of remaining times, wherein at least one of the corresponding set of the plurality of remaining times comprises the lowest remaining time.

9. The computer-implemented method of claim 8, wherein the plurality of synchronization intervals is based on a corresponding plurality of service level agreements.

10. The computer-implemented method of claim 8, wherein estimating the plurality of execution times is based on at least one of a time of day and a plurality of synchronization task types.

11. The computer-implemented method of claim 8, wherein ordering the plurality of synchronization tasks based on the corresponding plurality of remaining times further comprises executing a first synchronization task corresponding to a first remaining time before a second synchronization task corresponding to a second remaining time that equals the first remaining time based on the first synchronization task corresponding to a first synchronization interval and the second synchronization task corresponding to a second synchronization interval, wherein the first synchronization interval is less than the second synchronization interval.

12. The computer-implemented method of claim 8, wherein executing the set of the plurality of synchronization tasks comprises:

decrementing each of the plurality of remaining times periodically based on a passage of time;

determining whether a synchronization task of the plurality of synchronization tasks corresponds to an execution time that is less than an execution time threshold;

ordering the synchronization task before other synchronization tasks of the plurality of synchronization tasks in response to a determination that the synchronization task corresponds to the execution time that is less than the execution time threshold; and executing the set of the plurality of synchronization tasks based on the corresponding set of the plurality of remaining times and the execution time that is less than the execution time threshold.

13. The computer-implemented method of claim 8, wherein the set of the plurality of synchronization tasks comprises a number of synchronization tasks that equals a number of available system synchronization agents.

14. The computer-implemented method of claim 8, wherein each of the corresponding set of the plurality of remaining times is less than a remaining time threshold.

15. A computer program product, comprising a non-transitory computer-readable medium having a computer-readable program code embodied therein to be executed by one or more processors, the program code including instructions to:

identify a plurality of synchronization intervals corresponding to a plurality of synchronization tasks for synchronizing content changes between a first database associated with a content management system and a second database;

estimate a plurality of execution times corresponding to the plurality of synchronization tasks;

calculate a plurality of remaining times corresponding to the plurality of synchronization tasks, wherein the plurality of remaining times is based on the plurality of synchronization intervals corresponding to the plurality of synchronization tasks minus the estimated plurality of execution times corresponding to the plurality of synchronization tasks;

order the plurality of synchronization tasks for execution based on the corresponding plurality of remaining times, from a lowest remaining time to a highest remaining time;

execute a set of the plurality of synchronization tasks based on a corresponding set of the plurality of remaining times to change one or more objects in the second database based on a change to one or more objects in the first database, wherein at least one of the corresponding set of the plurality of remaining times comprises the lowest remaining time.

16. The computer program product of claim 15, wherein the plurality of synchronization intervals is based on a corresponding plurality of service level agreements.

17. The computer program product of claim 15, wherein estimating the plurality of execution times is based on at least one of a time of day and a plurality of synchronization task types.

18. The computer program product of claim 15, wherein ordering the plurality of synchronization tasks for execution based on the corresponding plurality of remaining times further comprises ordering a first synchronization task corresponding to a first remaining time before a second synchronization task corresponding to a second remaining time that equals the first remaining time based on the first synchronization task corresponding to a first synchronization interval and the second synchronization task corresponding to a second synchronization interval, wherein the first synchronization interval is less than the second synchronization interval.

19. The computer program product of claim 15, wherein executing the set of the plurality of synchronization tasks comprises:

decrementing each of the plurality of remaining times periodically based on a passage of time;

determining whether a synchronization task of the plurality of synchronization tasks corresponds to an execution time that is less than an execution time threshold;

ordering the synchronization task before other synchronization tasks of the plurality of synchronization tasks in response to a determination that the synchronization task corresponds to the execution time that is less than the execution time threshold; and executing the set of the plurality of synchronization tasks based on the corresponding set of the plurality of remaining times and the execution time that is less than the execution time threshold.

20. The computer program product of claim 15, wherein the set of the plurality of synchronization tasks comprises a number of synchronization tasks that equals a number of available system synchronization agents, and wherein each of the corresponding set of the plurality of remaining times is less than a remaining time threshold.

* * * * *